July 15, 1952     G. M. MIERLEY ET AL     2,603,540
BEARING SUPPORT
Filed May 22, 1947
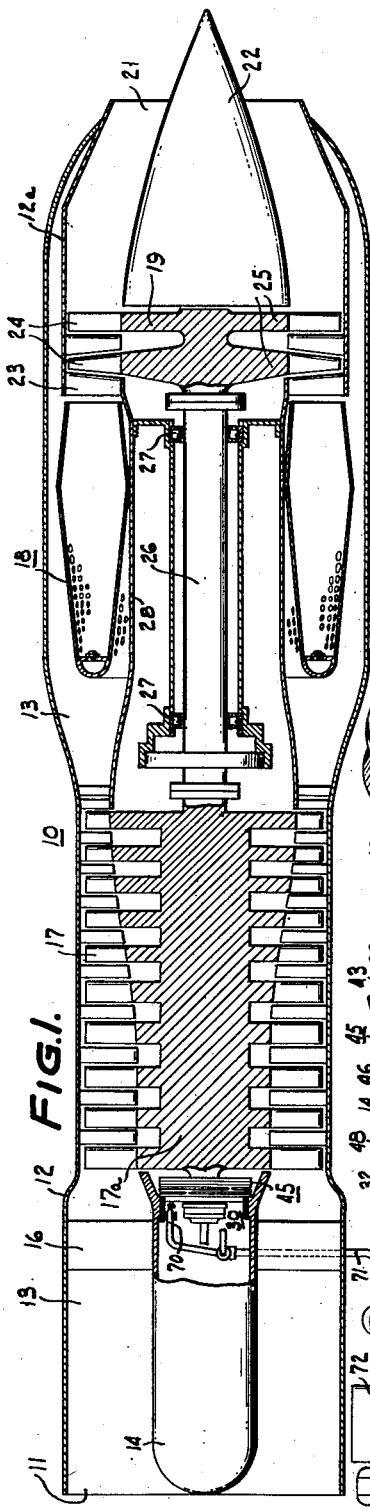
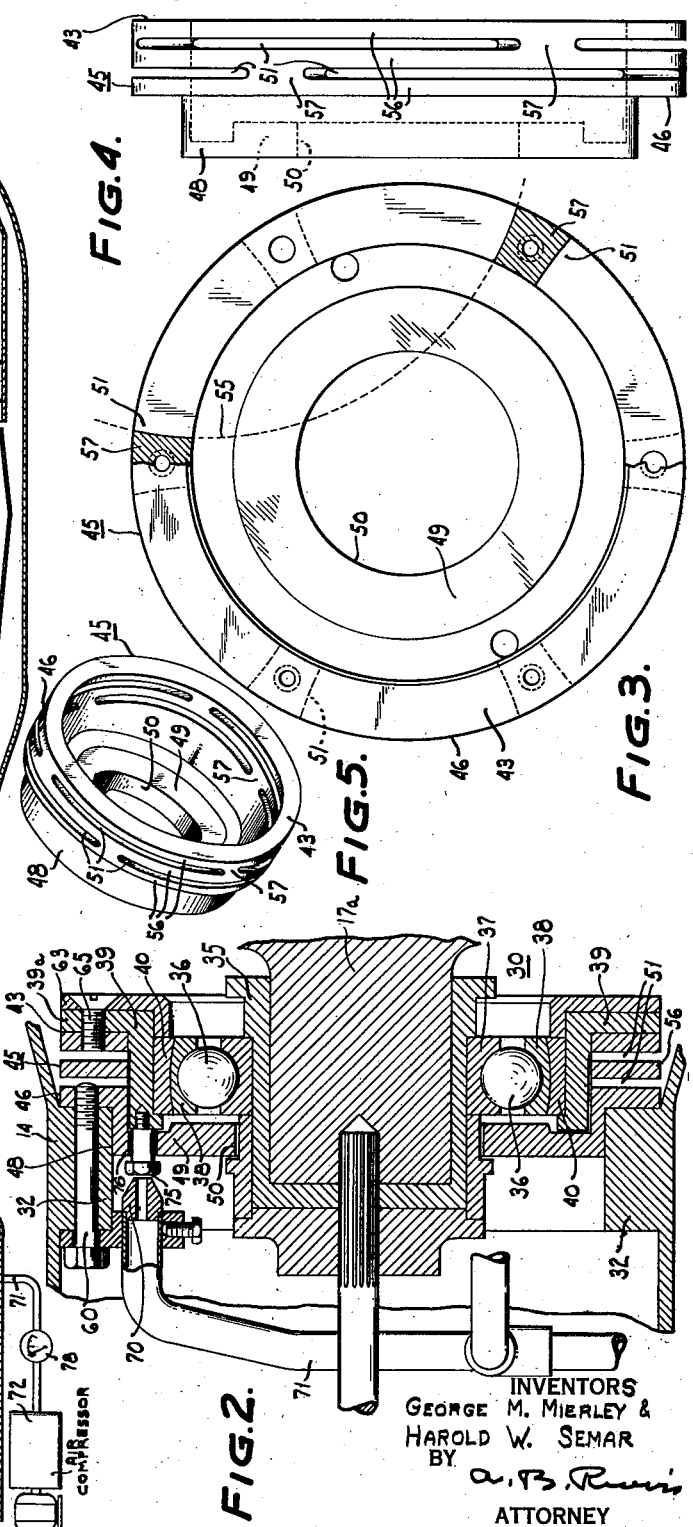
INVENTORS
GEORGE M. MIERLEY &
HAROLD W. SEMAR
BY
ATTORNEY Patented July 15, 1952

2,603,540

UNITED STATES PATENT OFFICE 2,603,540

BEARING SUPPORT

George M. Mierley, Havertown, and Harold W. Semar, Drexel Hill, Pa., assignors to Westinghouse Electric Corporation, East Pittsburgh, Pa., a corporation of Pennsylvania Application May 22, 1947, Serial No. 749,816

5 Claims. (Cl. 308—26)

This invention relates to rotary engines, and more particularly to a bearing assembly for a gas turbine power plant.

In the development of modern rotating engines, such as turbines, the demand for extremely high rotating velocities and the high operational temperatures encountered in service have presented new problems with respect to design, construction and maintenance of bearings, particularly bearings of the thrust type. One class of rotary engine which is operative at high speeds is the well-known gas turbine power plant developed for the propulsion of aircraft. Such a plant may include a rotary compressor, fuel combustion apparatus, and a gas turbine operative by heated motive fluid under pressure delivered by the combustion apparatus for driving the compressor at velocities which may be on the order of 34,000 R. P. M. It has been proposed to provide a shaft common to both the compressor and the turbine for this type of engine, the necessary bearings including a thrust bearing in which the forward end of the compressor is journaled.

A principal object of the present invention is the provision of an improved thrust bearing having features of construction particularly useful in a gas turbine apparatus of the aforesaid class.

Another object of the invention is to provide an improved thrust bearing assembly including a mounting member having angular and axial flexibility for facilitating accurate alignment of the bearing.

It is still a further object to provide a bearing support structure constructed and arranged to permit measurement of axial deflection for indicating the thrust load.

An important feature of the invention is the provision of an annular bearing mounting member having slots arranged in staggered relation for imparting angular and axial flexibility thereto, so that an assembled bearing unit containing the mounting member can be readily accommodated in an engine regardless of any slight misalignment of the shaft axis with respect to the housing structure.

Other objects, features and advantages of the invention will appear in the following more detailed description thereof, taken in connection with the accompanying drawing, in which:

Figure 1 is a schematic side-elevational sectional view of a gas turbine power plant incorporating the present invention.

Figure 2 is a fragmentary enlarged-detail sectional view of the thrust bearing and related parts shown in Figure 1;

Figure 3 is a plan view, partly in section, of the bearing mounting member constructed in accordance with the invention;

Figure 4 is a side view of the member shown in Figure 3; and

Figure 5 is an isometric view of the aforesaid mounting member.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and for discharging the hot gases at suitable temperature and pressure to the turbine. The gases on leaving the turbine are discharged through a nozzle provided at the rear of the casing and may aid in propelling the aircraft.

Referring now to the drawing more in detail, the power plant shown in Figure 1, and indicated in its entirety by the reference character 10, is adapted to be mounted in or on the fuselage or wing of an aircraft with the left end or intake 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial-flow compressor 17, combustion apparatus generally indicated 18, a turbine 19 which drives the compressor, and a nozzle 21 defined by the casing 12a and by a tailpiece 22, which is mounted concentrically in the casing.

Air enters at the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine discs 25 and then are discharged through the propulsion nozzle 21 to propel the aircraft.

A common shaft 26 is provided for connecting the rotor of the turbine 19 and the rotor 17a of the compressor. Suitable bearings 27 enclosed within an inner wall structure 28 are provided for supporting the shaft 26, it being understood that the inner wall structure is adapted to shield the shaft and bearings from the high temperatures encountered in the combustion apparatus 18. According to the invention, the forward end of the compressor rotor 17a is rotatably mounted in a thrust bearing assembly, generally indicated by the reference character 30.

Referring to Figure 2, the thrust bearing assembly 30 is mounted within the rearwardly-disposed open end of the fairing cone 14, the inner wall of which is provided with a suitable annular supporting flange 32 to which the bearing assembly may be secured. The thrust bearing assembly 30 comprises a sleeve member 35 which is adapted to be press-fitted over the adjacent end of the compressor rotor 17a, a plurality of ball bearings 36 interposed between inner and outer races 37 and 38, and an annular bearing housing 39, which is adapted to contain the ball bearing and race assembly through the medium of an interposed annulus 40. The bearing housing 39 is provided with an annular flange 39a which is adapted to engage a complementary face 43 of a generally cylindrical bearing mounting member 45, which in accordance with the invention is constructed and arranged to be secured to the fairing cone 14 for providing the desired angular and axial flexibility.

Referring now to Figures 3 and 4, the bearing mounting member 45 comprises a cylindrical body 46, one end of which carries the mounting face 43, and at the other end of which is formed an annular portion 48 of reduced diameter terminating in an inwardly-extending annular wall 49 having a central aperture 50. Formed in the body 46 are a plurality of elongate slots 51 of equal arcuate length, which are in the present embodiment of the invention disposed in two rows and are arranged in staggered relation normal to the axis of the member, as best shown in Figure 5 of the drawing. As indicated in Figure 3, these slots 51 are preferably formed by means of a suitable saw (not shown) providing a saw cut of substantially the radius shown in dotted lines at 55.

It will be noted that the slots 51 are formed between the relatively narrow strip portions 56, which strip portions are integrally joined at relatively offset points by bridge portions 57, so that the body 46 of the member will be adapted to yield to a limited extent, or in other words, to permit angular and axial flexing of the member under load.

Referring again to Figure 2 of the drawing, the bearing mounting member 45 is adapted to be interposed between the bearing housing 39 and the annular flange 32 of the fairing cone, to which the mounting member may be secured by means of a plurality of bolts 60 extending through suitable bores formed in the flange 32, and fitted into screw-threaded relation with longitudinal bores formed in the body 46. It will be observed that the bolts 60 extend through only the portion of the body 46 outwardly of the adjacent row of slots 51. For locking the assembled ball bearings 36 and races 38 in place, there is provided an annular bearing retainer 63 having a shoulder engageable with the annulus 40, which retainer is adapted to be secured through the medium of a plurality of screws 65 fitted through registering apertures formed therein and in the bearing housing 39, and screwed into suitable bores formed in the adjacent portion of the body 46 outwardly of the slots 51.

It will now be apparent that with the elements assembled as shown in Figure 2, the bearing mounting member 45 is adapted to withstand the entire load to which the ball bearings 36 and associated elements are subjected during operation of the compressor rotor 17a. By reason of the staggered slots 51 formed in the bearing mounting member 45, any misalignment of the axis of the rotor 17a with respect to the axis of the fairing cone 14 can be accommodated by flexing of the body portion 46. In this respect the bearing mounting member 45 will function in a manner somewhat similar to that of a spherically-supported outer race for a bearing, without, however, involving any of the uncertain frictional forces apt to be encountered in the latter type of bearing.

If desired, suitable thrust measuring mechanism may be associated with the thrust bearing assembly 30 to indicate deflection in an endwise direction for thereby measuring the thrust load. For this purpose, there may be provided one or more fluid nozzles 70 communicating with a conduit 71 to which compressed air may be supplied from a motor-driven air compressor 72, as shown in Figure 1. Each nozzle 70 may be arranged to direct a jet of compressed air against a surface 75 of an adjustable member carried by the bearing housing 39 and extending through a suitable aperture 76 formed in the flange 49 of the mounting member 45. It will be understood that the surface 75 will be deflected with respect to the fixed nozzle 70 in proportion to the thrust load applied to the bearing assembly 30, due to slight flexing of the bearing mounting member 45. By supplying compressed air from the compressor 72 to the conduit 71 at a predetermined pressure as indicated by a gage 78, and bleeding air from the conduit through an adjacent calibrated port (not shown) variations in the pressure indicated by the gage in accordance with variations in the rate of flow at the nozzle 70, can be utilized for indicating the degree of deflection of the bearing assembly 30, and consequently the thrust load thereon. It should be understood that the apparatus employed for thus measuring the thrust load does not form any part of the present invention.

From the foregoing, it will be seen that an improved thrust bearing assembly constructed in accordance with my invention, and including the novel bearing mounting member 45 just described may be employed to advantage in various types of rotary engines or turbines of existing design. The bearing mounting member has sufficient strength in structural combination with the related elements described to provide adequate support for the thrust bearing assembly, and is nevertheless adapted to permit the degree of flexing which may be desired for facilitating alignment of the rotor shaft, or for measurement of the deflection indicating thrust load.

While the invention has been shown in but one form, it will be obvious to those skilled in the art that it is not so limited, but is susceptible of various changes and modifications without departing from the spirit thereof.

What is claimed is:

1. In combination, a thrust bearing assembly, a bearing mounting adapted to receive axial thrust on said bearing and comprising a substantially cylindrical body having a plurality of circumferentially arranged groups of spaced slots disposed in staggered relation normal to the axis thereof, said slots being defined between relatively flexible arcuate strip portions overlapping integral bridge portions for rendering said bearing mounting yieldable to a limited extent, means securing one of said strip portions in supporting relation to said thrust bearing assembly, and stationary means for anchoring another of said strip portions to prevent displacement of said bearing assembly in a radial direction.

2. A one-piece resilient bearing mounting for a thrust bearing assembly, said bearing mounting being adapted to receive axial thrust on said bearing and comprising an annular body section having formed thereon a plurality of relatively yieldable arcuate strip portions forming slots disposed in staggered relation normal to the axis thereof, said strip portions being joined at intermediate points by integral bridge portions, the strip portions at opposite ends of said bearing mounting having bolting faces, means securing said bearing assembly to one of said bolting faces, and stationary means bolted to the other bolting face for holding said bearing assembly against lateral displacement.

3. In a bearing and support structure of the class described, thrust bearing including a ball and race assembly, an annular bearing housing encompassing said thrust bearing and having a flange, a flexible bearing support comprising an integral annular body rigidly anchored at one side and having a double row of spaced slots formed in staggered relation substantially normal to the axis of the bearing, said body being angularly and axially flexible under load, and means for securing said flange of the bearing housing assembly to the other side of said flexible bearing support for imparting thereto the thrust load on said thrust bearing.

4. A resilient mounting for a thrust bearing assembly having stationary support structure and bearing race means, comprising an annular bearing housing engaging said bearing race means, a cylindrical body having a double row of circumferentially-spaced slots disposed in staggered relation to provide opposite annular end flanges, the inner surface of said body being engageable with said bearing housing, means for securing one of said flanges to said stationary support structure, and means for applying to the opposite flange the thrust of said bearing race means, said slots rendering said body angularly and axially flexible under load.

5. In combination, a thrust bearing assembly, an annular bearing housing engaging said bearing assembly, a one-piece resilient bearing support adapted to receive axial thrust on said bearing and comprising a substantially cylindrical body encompassing said bearing and having a plurality of axially spaced rows of circumferentially aligned slots disposed in staggered relation between annular end portions for rendering said bearing support axially and angularly flexible under thrust loading of the bearing assembly, means securing one end portion of said bearing support to said bearing housing, and stationary means for anchoring the other end portion of said bearing support to prevent displacement of said bearing assembly in a radial direction.

GEORGE M. MIERLEY.
HAROLD W. SEMAR.

REFERENCES CITED

The following references are of record in the file of this patent:

UNITED STATES PATENTS

| Number | Name | Date |
|---|---|---|
| 1,557,958 | Anderson | Oct. 20, 1925 |
| 1,985,576 | Mennesson | Dec. 25, 1934 |
| 1,998,450 | Davis | Apr. 23, 1935 |
| 2,367,017 | Gardiner | Jan. 9, 1945 |
| 2,402,377 | Davenport | June 18, 1946 |

FOREIGN PATENTS

| Number | Country | Date |
|---|---|---|
| 50,002 | Sweden | Oct. 14, 1918 |
| 90,138 | Switzerland | Aug. 1, 1921 |